United States Patent [19]

Thele

[11] 4,121,347
[45] Oct. 24, 1978

[54] DEVICE FOR SETTING AND RETAINING A FIXED DIRECTION

[75] Inventor: Gunnar Thele, Koping, Sweden

[73] Assignee: Transtronic Ltd., Vesteras, Sweden

[21] Appl. No.: 759,583

[22] Filed: Jan. 14, 1977

Related U.S. Application Data

[63] Continuation of Ser. No. 585,399, Jun. 9, 1975, abandoned.

[30] Foreign Application Priority Data

Jun. 10, 1974 [SE] Sweden .............................. 7407596
May 28, 1975 [SE] Sweden .............................. 7506069

[51] Int. Cl.² .............................................. G01C 9/06
[52] U.S. Cl. .............................................. 33/366
[58] Field of Search ........................... 33/312, 366; 340/177 VA

[56] References Cited

U.S. PATENT DOCUMENTS

| 2,635,349 | 4/1953 | Green ..................................... 33/312 |
| 2,893,134 | 7/1959 | Shea et al. ............................... 33/366 |
| 3,604,119 | 9/1971 | Inove .................................. 33/366 X |
| 3,776,315 | 12/1973 | Gill et al. ........................... 33/366 X |
| 3,824,699 | 7/1974 | Lenz et al. .......................... 33/366 X |
| 3,852,890 | 12/1974 | Locklair et al. ....................... 33/366 |
| 3,865,265 | 2/1975 | Brudi et al. ........................ 33/366 X |

*Primary Examiner*—Charles E. Phillips
*Attorney, Agent, or Firm*—Burns, Doane, Swecker & Mathis

[57] ABSTRACT

An apparatus for sensing and indicating the orientation of an object, such as a machine part, in a generally horizontal plane comprises two interconnected tilt sensing devices whose resistances vary responsive to the tilt of the devices. At least one of said sensing devices is mounted rotatably and via a bevel gear connected to the object.

9 Claims, 8 Drawing Figures

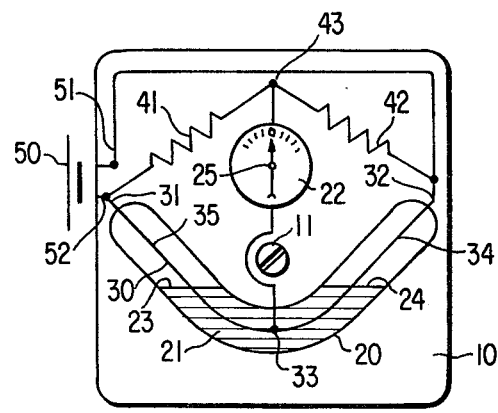
FIG. 1 STATE OF ART
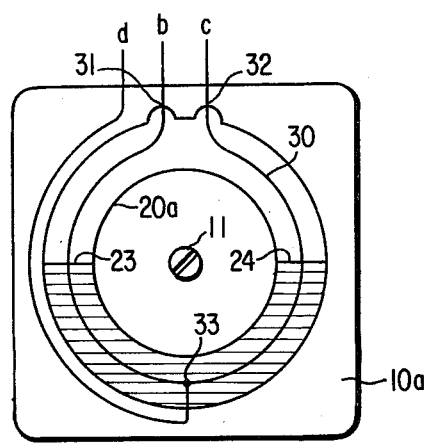
FIG. 2
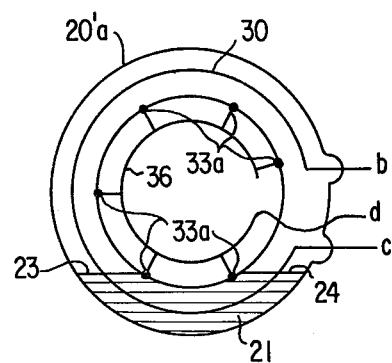
FIG. 3

DEVICE FOR SETTING AND RETAINING A FIXED DIRECTION

RELATED APPLICATIONS

This is a continuation of application Ser. No. 585,399, filed June 9, 1975, now abandoned which is hereby incorporated by reference in its entirety.

BACKGROUND OF THE INVENTION

The present invention relates to an apparatus for setting and retaining a fixed direction in an essentially horizontal plane. The main field of application of such an apparatus is the alignment, and particularly the repeated alignment, of a tool such as a drill or the like. Alignment problems of this kind arise when drilling rock, in workshop practice, etc.

When working, e.g., with a rock drill, it may be necessary to drill a series of holes which are to be as parallel with one another as possible. The holes can extend either in an essentially horizontal or in an essentially vertical plane at a specified inclination to one of these two planes, depending on whether the drilling is made, e.g., in a wall, in a bottom or in a ceiling. In the last mentioned case, but also in tunnel driving or the like, it is particularly important that the bore holes be parallel one with another according to two coordinates, i.e., so that they all not only extend in the same plane, but also at invariable mutual distance. When drilling in a horizontal plane, this requirement means in effect that each drilling must be effectuated both in a single plane and parallel one with another.

These requirements are difficult to meet in practice, mainly because at the transfer of the rock drill from the place where one hole or one series of holes has been made to the place of another hole or hole series, the slope of the ground often changes. It is therefore not possible simply to retain the relative position between the drill feeder and the machine stand, as adjusted at the first drilling.

An automatic levelling control and clinometer has been proposed in the U.S. Pat. No. 2,893,134 for holding the scraper blade of a road grader at a predetermined angle of inclination (i.e., direction in a vertical plane) which clinometer in one embodiment has a tilt-responsive position sensor in the form of a V-shaped tube of non-conductive material, partially filled with an electrically conductive fluid such as mercury. Through the tube extends lengthwise a resistance wire which is thus partially immersed in the volume of mercury. The mercury volume is at its lowest point connected to a meter, via an intermediate contact in the tube, while the resistance wire is connected at both ends to a pair of resistors in a bridge circuit of the Wheatstone type. The other pair of resistors in this bridge circuit is formed by those legs of the resistance wire, which are not shunted by immersion in the mercury in the tube.

An object of the present invention is to provide a setting device of the above type which can be used for position measurement or adjustment in or near a horizontal plane, with compensation for any vertical inclination that may occur.

SUMMARY OF A PREFERRED EMBODIMENT

The above and other objects are attained by the apparatus described herein for automatically setting and retaining the direction in a substantially horizontal plane of an object such as a part of a machine. The apparatus may comprise two sensing means, each in the form of a tube or like passageway for a tilt-responsive contact element such as a volume of mercury or the like. A resistance wire may extend lengthwise in an insulated manner in the passageway and at least one fixed intermediate contact point may be located between the ends of the resistance wire. Circuitry may be provided for electrical resistance measurements including an indicator means and connection means for connecting the circuitry to a source of electrical power. At least one of said sensing means is mounted rotatably in a vertical plane and mechanically connected to the object. In all embodiments it is the cooperation of the mounting and electrical interconnection of the sensors, by one means or several, which provides the desired output signals from the sensors.

These and other objects and features of the invention will become apparent from the claims and from the following description when read in conjunction with the appended drawings.

THE DRAWINGS

FIG. 1 is a schematic representation of a sensing tube according to the state of art;

FIG. 2 is a view of one preferred embodiment of a sensing tube for use in an apparatus according to the invention;

FIG. 3 shows an alternative embodiment of the sensing tube;

DETAILED DESCRIPTION

Figure 4:
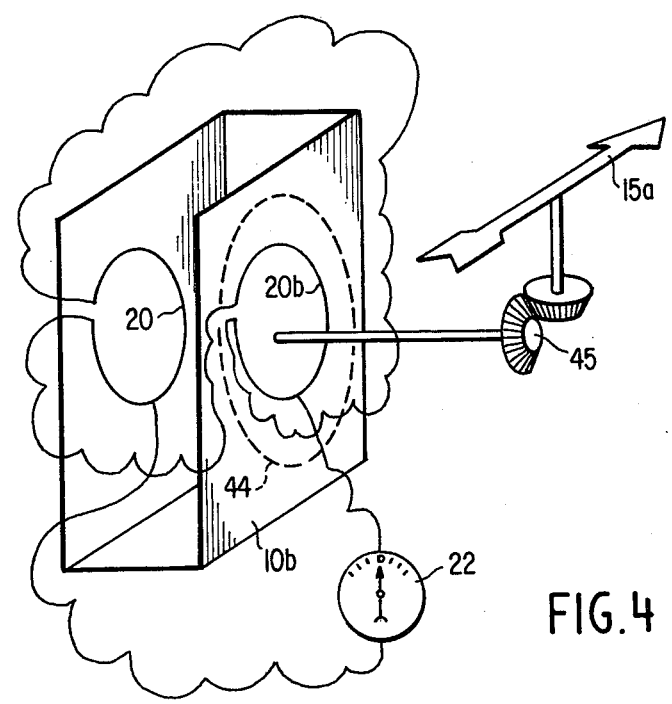
FIG. 4 shows an embodiment of the apparatus according to the invention.

Referring now to FIG. 1, a V-shaped sensing device is shown comprising a tube of electrically non-conductive material such as glass or plastic which, according to the state of art, is located in a housing 10 and partially filled with conductive liquid such as a volume of mercury 21. A screw 11 serves for fastening the housing 10 to an object (not shown) the vertical orientation of which is to be measured. In the measuring tube 20 extends lengthwise a resistance wire 30, the two end points 31, 32 of which are connected to resistor elements 41, 42 which form a resistor pair in a Wheatstone bridge circuit. The end points 31, 32 are also connected to terminals 51, 52 for connecting a source of electrical energy (battery) 50. The midpoint between the ends 31, 32 of the resistance wire 30 is connected to an ammeter 22 which, in turn, is further connected to junction 43 between the two resistor elements 41 and 42.

The liquid levels 23 and 24 in the left and in the right leg of the measuring tube 20 lie in the example shown in the drawing at the same height over the intermediate contact point 33, with the result that the parts 34 and 35 of the resistance wire 30, which are not immersed in and thus shunted by the mercury volume 21 are equally long and thus have equal resistance. The pointer 25 of the ammeter 22 therefore indicates zero or some other selected reference value. When the device is tilted to one side this state of electrical equilibrium is disturbed, and the pointer 25 indicates the deviation.

In FIG. 2, where corresponding components have received identical or similar reference characters as in FIG. 1, the sensing tube (20a in FIG. 2, 20'a in FIG. 3) according to a preferred embodiment of the present invention is made of glass, has an annular shape and is fully enclosed. The resistance wire 30, disposed in the sensing tube 20a, has two separate end points 31 and 32 and an intermediate contact point 33. The points 31, 32, 33 are connected to conductors b, c and d corresponding in turn to terminals 52, 51 and 33 in the embodiment according to FIG. 1.

FIG. 3 shows an embodiment of the sensing tube with a multiple intermediate contact. Tube 20'a is shown in a position turned by 90° relative tube 20a in FIG. 2. Tube 20a would not be operable in such a position because the contact point 33 would lie outside the mercury column 21 or the disproportion between the two legs of this column would be so extreme that accurate measurement were not possible. The housing 10a is for simplicity not shown in FIG. 3. Along the periphery of tube 20'a are disposed several contact points 33a in the form of metal pins penetrating through and fused into the wall of the glass tube 20'a. These pins 33a are outside the tube 20'a electrically connected one to another by a conductor 36, forming a part of or connected to the earlier named connection d to the indicator means (FIG. 2). The contact pins 33a have such mutual distances that at least one of them always is immersed in the mercury volume 21, i.e., a distance which is shorter than the length of this mercury volume or column. Irrespective of which position the tube 20'a is tilted, some of the pins 33a will always be in contact via the mercury volume 21 with the resistance wire 30. Because all pins 33a are, with the exception of the connection via the mercury volume, independent of the resistance wire 30, the mercury volume 21 forms a movable but permanent electrical connection between some of the pins and the resistance wire. It is obviously also possible to place the connecting wire 36 inside the sensor tube 20', parallel with but isolated (with the exception of the mercury volume, of course), from the resistance wire 30, instead of the individual contact points or pins 33a, fused into the wall of the sensor tube thus creating an infinite number of contact points.

In FIG. 4, an apparatus according to the present invention is shown for indicating the orientation of an object in a horizontal plane. Two sensing tubes 20, 20b, disposed in generally vertical planes, are arranged generally parallel with one another and tube 20b is mounted on a mount 44 which is rotatably arranged in a housing 10b, as is symbolized by a dashed circular line. The mount 44 is mechanically connected to the object by a bevel gear drive 45 which terminates at an arrow 15a symbolizing the object. The housing 10b is shown with the front and upper walls removed to show that tube 20 is fixedly mounted. A power source is connected between both tubes 20, 20b essentially in the same way as in FIG. 8, the connection not being shown in the drawing for clarity. It will be readily understood from the Figures that tilt responsive resistance variations in the first sensor 20 and in the second sensor 20b caused by shared motion of the sensors with respect to the vertical force of gravity will be approximately equal and will compensate each other. For example, if the housing 10b tilts with respect to the vertical, the sensors will experience shared motions and the resistances detected by the indicator 22 will increase or decrease simultaneously and to the extent, so that that indicator 22 remains balanced. If, however, the sensor 20b rotates with respect to the housing while the sensor 20 remians fixed with respect to the vertical, the indicator 22 will indicate the extent of this relative motion, i.e., motion which is not shared by both sensors.

Figure 5:
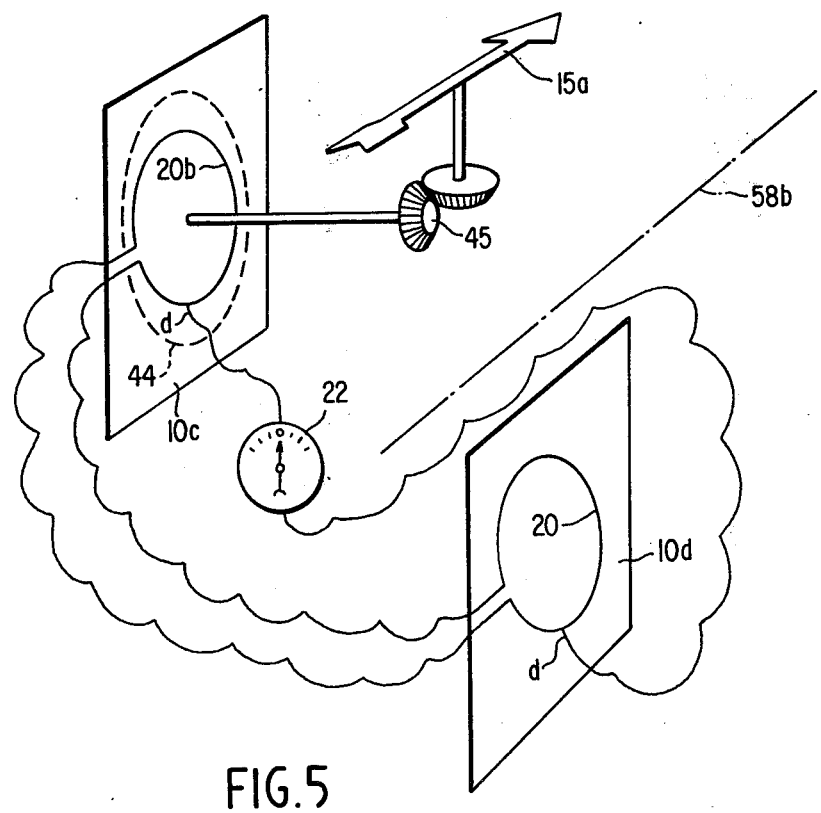
FIG. 5 shows a further embodiment of the apparatus according to the invention.

FIG. 5 shows another embodiment of the present invention wherein sensing tubes 20 and 20b are influenced by different parts of the object (boring machine, etc.). Two sensor units (housings) and one indicator unit (housing) or one complex unit (housing incorporating one sensing tube and the indicator) and one additional sensor unit are possible configurations of this arrangement, shown in FIG. 7, which will now be discussed.

Figure 6:
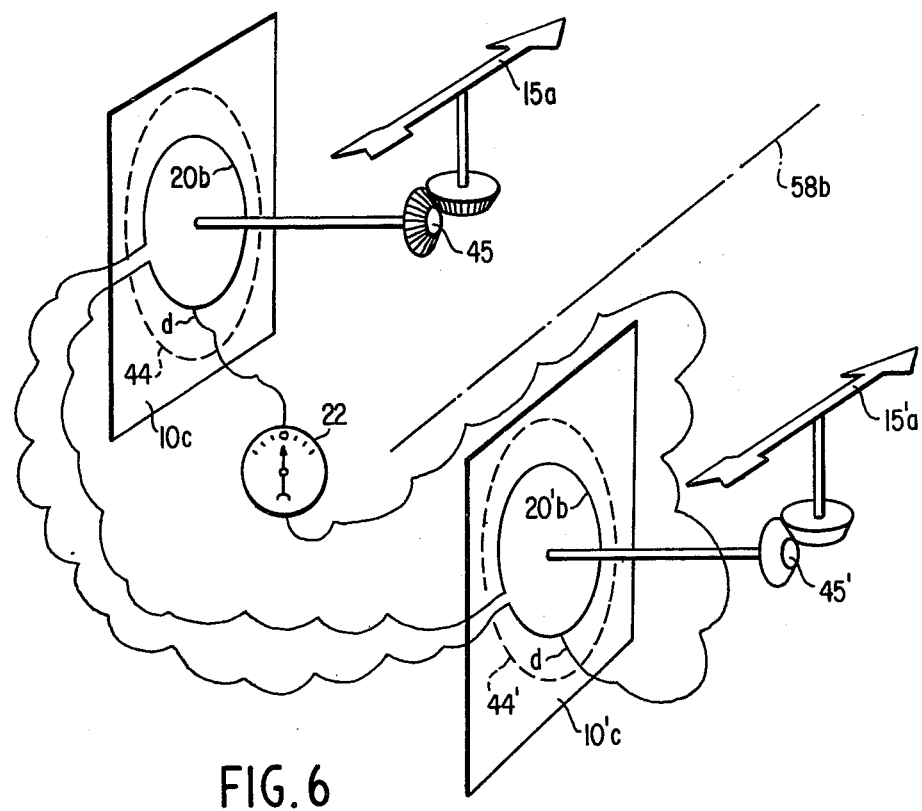
FIG. 6 shows yet another embodiment of the apparatus according to the invention.
Figure 7:
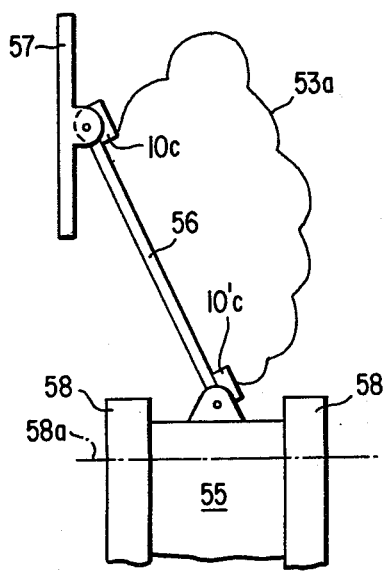
FIG. 7 shows the arrangement of an apparatus according to FIG. 5 on a rock drilling machine shown in a schematic plan view; and, FIG. 8 is a simplified circuit diagram of the embodiments according to FIGS. 4 to 6.

A drilling machine has an undercarriage or a truck 55, the front part of which is shown in plan view in FIG. 7. The truck 55 runs on caterpillar tracks 58 which are driven by wheels (not shown) having a wheel axis 58a. Pivotally arranged on the truck 55 is an arm 56 which in turn bears, also pivotally, a feeder 57 for a drill or the like (not shown). Fixed to the arm 56 is a sensor unit 10c with the first, rotatable sensing tube 20b (FIG. 5 or 6). This tube 20b is via the bevel gear drive 45 connected to the feeder 57 and can thus together with the said feeder be set relative a line 58b (FIG. 5) which represents the longitudinal axis of the truck 55, perpendicular to the wheel axis 58a. Both lines 58a and 58b lie in the horizontal plane, which also is the drawing plane of FIG. 7. The arrows 15a and 15'a (FIG. 6) represent symbolically the machine parts by which the rotatable sensors are influenced, e.g., the feeder 57 or the truck 55 of FIG. 7 which are to be set in a selected direction in the horizontal plane.

The indicator means 22 indicates a compensated value, because another sensor unit or a complex unit (sensor plus indicator) 10'c with sensing tube 20 (FIG. 5) is arranged on the drill truck 55. The value indicated by the indicator is compensated in that it reflects the relative position of the machine part with respect to the truck regardless of the orientation of the truck with respect to the direction of the force of gravity, i.e., the true vertical direction. The connection 53a (FIG. 7) symbolizes, in general, the electrical connection of parts 10c and 10'c, shown in detail in FIG. 5, and in known manner.

The disposition according to FIG. 6 differs from that according to FIG. 5 in that the sensor unit 10'c on the arm 56 (FIG. 7) is replaced by a sensor unit which is identical with the sensor unit 10c, i.e., has a rotatable sensing tube 20'b. Components of the sensor unit 20'b are identified by the same reference characters as in unit 20b, complemented with a dash. In operation, both sensor units 10c, 10'c are zeroed parallel with the longitudinal axis 58b.

A power source 50 (FIG. 8) is always connected to the junction between the two sensing tubes 20 and 20b (or 20b and 20'b) which are not shown in the drawing for clarity.

Figure 8:
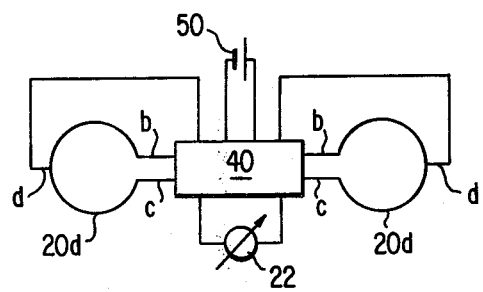

The wiring diagram according to FIG. 8 represents the circuit for measuring horizontal directions with compensation for vertical inclinations, according to the present invention, and the same reference characters as in the previous figures are used; 20d is any of the sensing tubes 20, 20b or 20'b. It will be apparent from the diagram that all components are connected to an addition and/or subtraction unit 40 of any known conventional design.

Those skilled in the art will appreciate that the tube or tubes according to the present specification and accompanying claims also can be realized, e.g., as a groove in a first body such as a plate, covered by a second body with or without a corresponding groove. It is further evident that in all embodiments one or both of the two sensing tubes may have a multiple intermediate contact according to FIG. 3. It is also obvious that the novel functional combination of two sensing tubes, exposed in the present specification for the measurement of horizontal directions with compensation of vertical inclinations, is in principle also realizable with the aid of previously known tilt-responsive electrical elements, such as the conventional V-shaped sensing tubes and are therefore included within the scope of the claims.

The principles, preferred embodiments and modes of operation, of the present invention have been described in the foregoing specification. The invention which is intended to be protected is not, however, to be construed as limited to the particular forms disclosed since these are to be regarded as illustrative rather than restrictive. Variations and changes may be made by those skilled in the art without departing from the spirit and scope of the present invention.

What is claimed is:

1. An apparatus for sensing and indicating the orientation of relatively movable parts of a object in an approximately horizontal plane, comprising first and second electrical sensors having an electrical resistance varying responsive to their tilt with respect to the vertical force of gravity, said sensors being arranged in approximately parallel mounting planes, means for electrically interconnecting and mounting said sensors on the measured object in such a manner that their said mounting planes are approximately vertical and their tilt responsive variations caused by shared motion with respect to the vertical force of gravity approximately canceling each other and their tilt responsive variations caused by relative motion with respect to each other provide indicia of said relative motion; electrical power supply means for providing power to the sensors; and, first mechanical means, including a rotatable mount and a bevel gear mechanism, for tilting the first sensor in its mounting plane independently of the second sensor and responsive to the movement of a part of the measured object in the approximately horizontal plane.

2. The apparatus of claim 1 wherein the second sensor is fixedly mounted on another part of the measured object than a part by which the first sensor is influenced.

3. The apparatus of claim 1 comprising second mechanical means, including a rotatable mount and a bevel gear mechanism allowing, for tilting the second sensor in its mounting plane, independently of the first sensor and responsive to the movement in the said at least approximately horizontal plane of another part of the measured object than that by which the first sensor is influenced.

4. The apparatus of claim 1 wherein at least one of the sensors is connected to a drill feeder of a rock boring machine for setting the drill feeder.

5. The apparatus of claim 4 wherein the first sensor is influenced by the drill feeder and the second sensor is influenced by a base means for supporting the drill feeder of the rock boring machine.

6. The apparatus of claim 1 wherein the first and second sensors each include:
 a vessel;
 a resistance wire disposed within the vessel;
 an electrical contact point; and
 a flowable, electrically conductive material contacting said resistance wire and said electrical contact point for providing a varying resistance between said contact and wire dependent upon the orientation of the sensor in a substantially vertical plane.

7. The apparatus of claim 6 in which at least one of the sensors is arranged in a sensing unit separate from the rest of the apparatus.

8. The apparatus of claim 6 wherein the resistance wire is provided with a plurality of intermediate contact points for making electrical connection with conductive material, said contact points being spaced apart distances which are shorter than the length of a column of the conductive material in the vessel.

9. The apparatus of claim 6 wherein the vessel is configured in the form of a closed curve.

* * * * *